United States Patent

Fukatsu et al.

[11] Patent Number: 4,476,419
[45] Date of Patent: Oct. 9, 1984

[54] WINDSHIELD WIPER CONTROL DEVICE

[75] Inventors: Yoshiaki Fukatsu, Nagoya; Takashi Kurahashi, Aichi; Kazuma Matsui, Toyohashi; Hiroki Ito, Oobu, all of Japan

[73] Assignee: Nippondenso Co., Ltd., Kariya, Japan

[21] Appl. No.: 499,405

[22] Filed: May 31, 1983

[30] Foreign Application Priority Data

May 31, 1982 [JP] Japan ................................ 57-92646

[51] Int. Cl.³ ............................ H02P 1/04; H02P 7/00
[52] U.S. Cl. .................................. 318/444; 318/313;
318/480; 318/DIG. 2; 15/250 C
[58] Field of Search ............... 318/280, 483, 313, 480,
318/444, 466, 443, DIG. 2; 324/58.5 B; 315/77,
82; 200/61.05; 15/250.17, 250 C, 250.12;
250/338, 341

[56] References Cited

U.S. PATENT DOCUMENTS 3,649,898 3/1972 Inoue .............................. 15/250 C
3,786,330 1/1974 Inoue et al. ................ 324/58.5 B X
3,794,847 2/1974 Cadiou ........................ 200/61.05 X
4,355,271 10/1982 Noack ..................... 318/DIG. 2 X

FOREIGN PATENT DOCUMENTS 1046654 10/1966 United Kingdom ................ 250/338

Primary Examiner—J. V. Truhe
Assistant Examiner—Bentsu Ro
Attorney, Agent, or Firm—Cushman, Darby & Cushman

[57] ABSTRACT

A windshield wiper control device for use on a vehicle includes a light-emitting unit mounted on the vehicle outside of a compartment for emitting a ray of infrared radiation, a photodetector unit mounted on the vehicle within the compartment and having a slit plate for producing an image of a striped pattern with bright and dark areas in response to exposure to the ray of electromagnetic radiation through the windshield and an array of photodetectors for sensing the bright and dark areas of the striped image and generating signals indicative of the bright and dark areas, and an arithmetic circuit arrangement for computing a contrast of the bright and dark areas based on the signals from the photodetectors and controlling the speed and/or period of operation of the windshield wiper based on the computed contrast.

8 Claims, 12 Drawing Figures

WINDSHIELD WIPER CONTROL DEVICE

BACKGROUND OF THE INVENTION

The present invention relates to a windshield wiper control devide for use on a vehicle, and more particularly to a windshield wiper control device for automatically controlling the speed or period of operation of a windshield wiper blade dependent on the quantity of raindrops falling on the windshield covered by the windshield wiper blade.

Prior windshield wiper control devices on motor vehicles include a manual switch actuatable by the driver for varying the speed or period of operation of a windshield wiper blade on the windshield to meet the quantity of raindrops falling on the windshield for giving the driver a clear vision therethrough. When it is necessary to adjust the speed or period of operation of the windshield wiper during driving operation, the driver has to actuate the manual switch with one hand while holding the steering wheel with the other hand. Such an adjusting operation makes the driver feel awkward and even tends to present an obstacle to the car driving operation as the manual switching is apt to divert the driver's attention. The conventional windshield wiper control device is also disadvantageous in that a failure in adjusting the speed or period of operation of the windshield wiper to meet a certain rain requirement causes obstruction to the driver's vision and increases an amount of electric power consumed by the windishield wiper.

SUMMARY OF THE INVENTION

It is an object of the present invention to provide a windshield wiper control device for automatically controlling the speed or period of operation of a wiper blade dependent on the quantity of raindrops on the windshield covered by the wiper blade, so that no manual wiper swiching operation will be necessary and good vision will be assured through the windshield under rain conditions.

Another object of the present invention is to provide an automatic windshield wiper control device of a low power requirement.

According to the present invention, a windshield wiper control device for use on a vehicle having a compartment with a windshield and a windshield wiper movable across the windshield comprises a light-emitting unit adapted to be mounted on the vehicle outside of the compartment for emitting a ray of electromagnetic radiation such as infrared radiation, a photodetector unit adapted to be mounted on the vehicle within the compartment and having a slit plate for producing an image of a predetermined pattern such as a striped pattern with bright and dark areas in response to exposure to the ray of electromagnetic radiation through the windshield and an array of photodetectors for sensing the bright and dark areas of the image and generating signals indicative of the bright and dark areas, and an arithmetic circuit arrangement for computing a contrast of the bright and dark areas based on the signals from the photodetectors and controlling the speed and/or period of operation of the windshield wiper based on the computed contrast.

BRIEF DESCRIPTION OF THE DRAWINGS

The present invention will be described in detail by way of illustrative example with reference to the accompanying drawings, in which.

DETAILED DESCRIPTION

Figure 1:
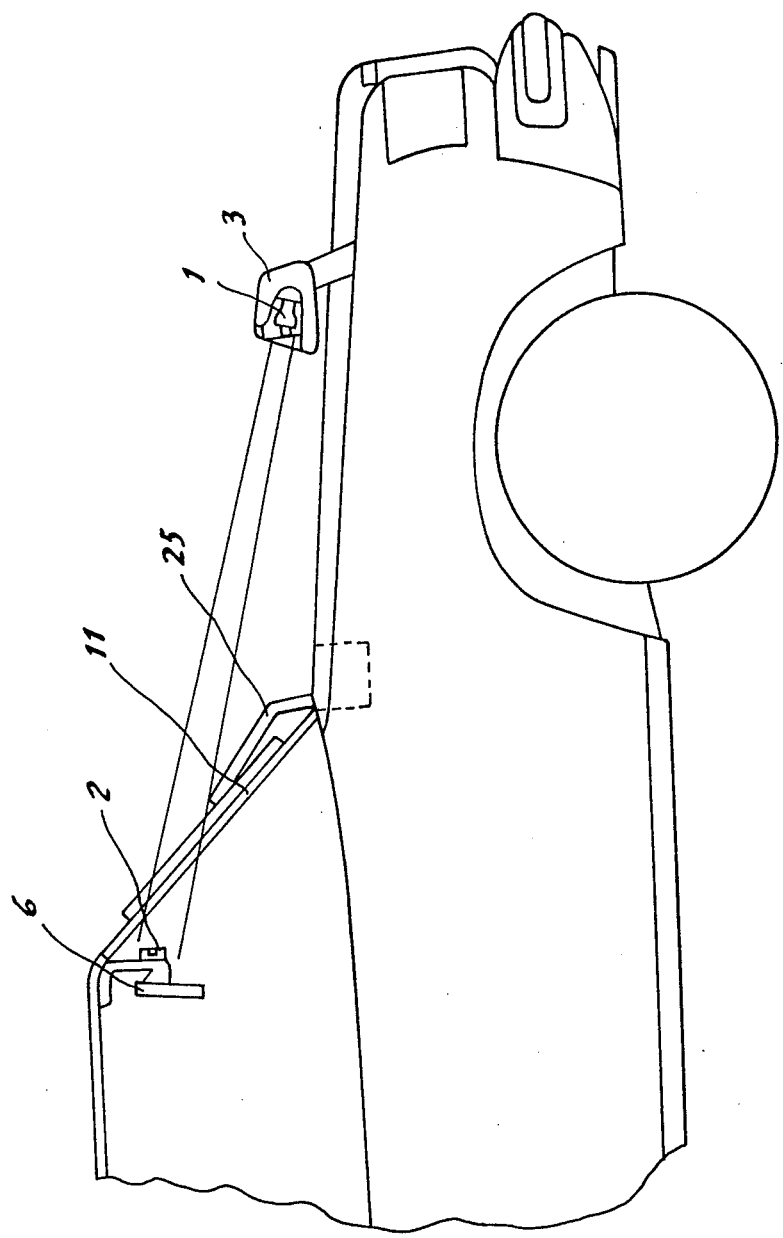
FIG. 1 is a side elevational view of a windshield wiper control device of the present invention, as mounted on an automobile.
Figure 2:
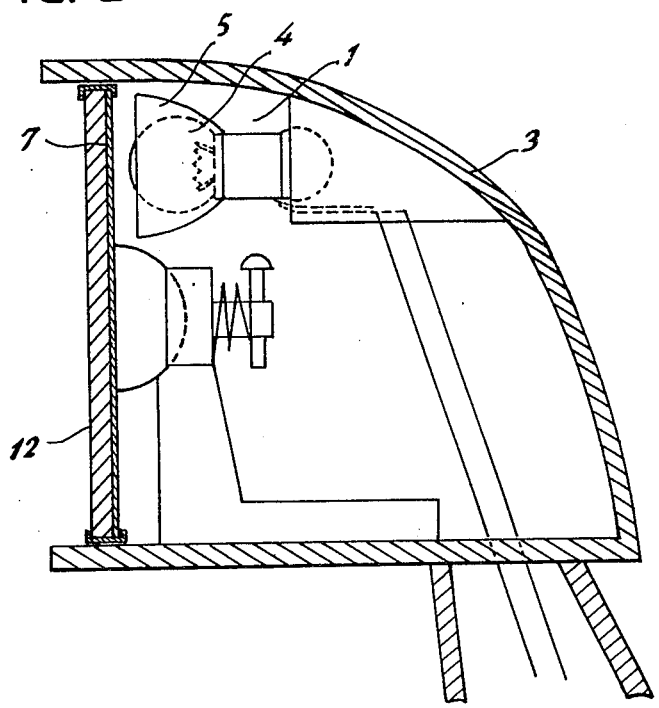
FIG. 2 is an enlarged cross-sectional view of a rearview mirror in which a light-emitting unit in the windshield wiper control device is accommodated.
Figure 3:
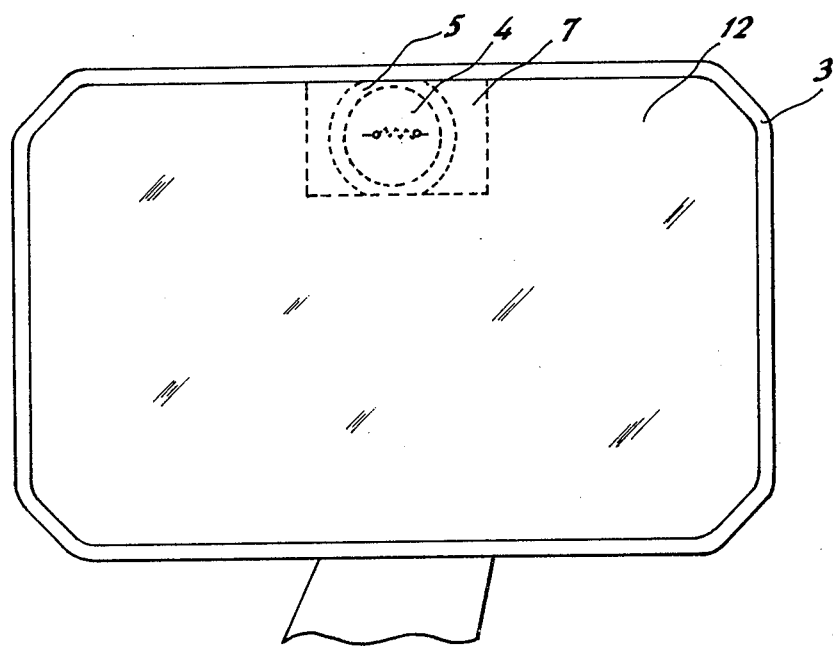
FIG. 3 is a front elevational view of the rearview mirror shown in FIG. 2.

As shown in FIGS. 1 through 3, a light-emitting unit 1 is mounted in a rearview mirror 3 attached to a fender of an automobile. The light-emitting unit 1 is composed of an electric lamp 4 disposed in the rearview mirror 3 and a reflecting concave mirror 5 positioned behind the lamp 4. The rearview mirror 3 includes a mirror 12 of glass having an infrared transmission filter 7 for reflecting visible light from the lamp 4 and passing infrared radiation from the lamp 4 therethrough toward a photodetector unit (describer later). The infrared transmission filter 7 comprises a film deposited, by way of vacuum evaporation, on a surface of the mirror 12. Since the infrared transmission filter 7 reflects more than about 90% of the visible light incident thereon, it also serves as a mirror.

Figure 4:
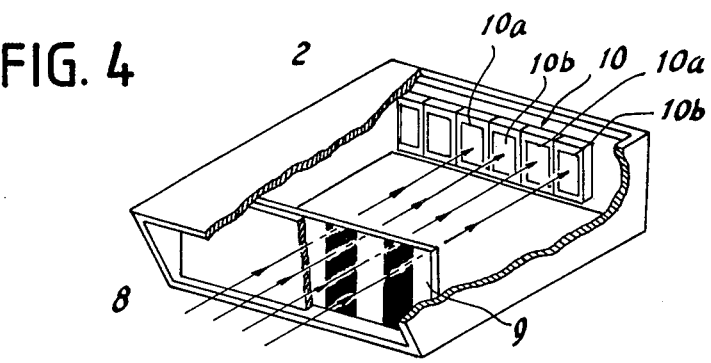
FIG. 4 is a perspective view, partly broken away, of a photodetector in the windshield wiper control device.
Figure 5:
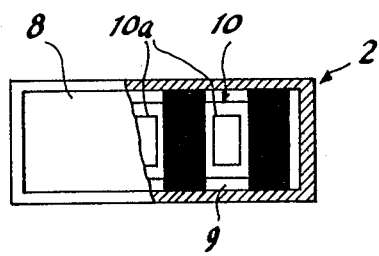
FIG. 5 is a front elevational view, partly broken away, of the photodetector illustrated in FIG. 4.

As illustrated in FIG. 1, a photodetector unit 2 is attached to a support stem of a rearview mirror 6 in an automobile compartment for receiving an infrared radiation ray from the light-emitting unit 1 through a windshield 11. In FIGS. 4 and 5, the photodetector unit 2 comprises a sensor 10 composed of a plurality of photodetectors for generating signals indicative of the incident infrared radiation. The photodetector unit 2 also includes an infrared transmission filter 8 positioned in front of and spaced from the sensor 10 and a slit plate 9 having a plurality of vertical slits laterally spaced at intervals and interposed between the infrared transmission filter 8 and the sensor 10. The plurality of photodetectors of the sensor 10 include bright photodetectors 10a for detecting infrared radiation through bright areas of an image of the striped pattern of the slit plate 9 and dark photodetectors 10b for detecting infrared radiation through dark areas of the striped image of the slit plate 9, the bright and dark photodetectors 10a, 10b being alternately arranged laterally in the photodetector unit 2.

Figure 8:
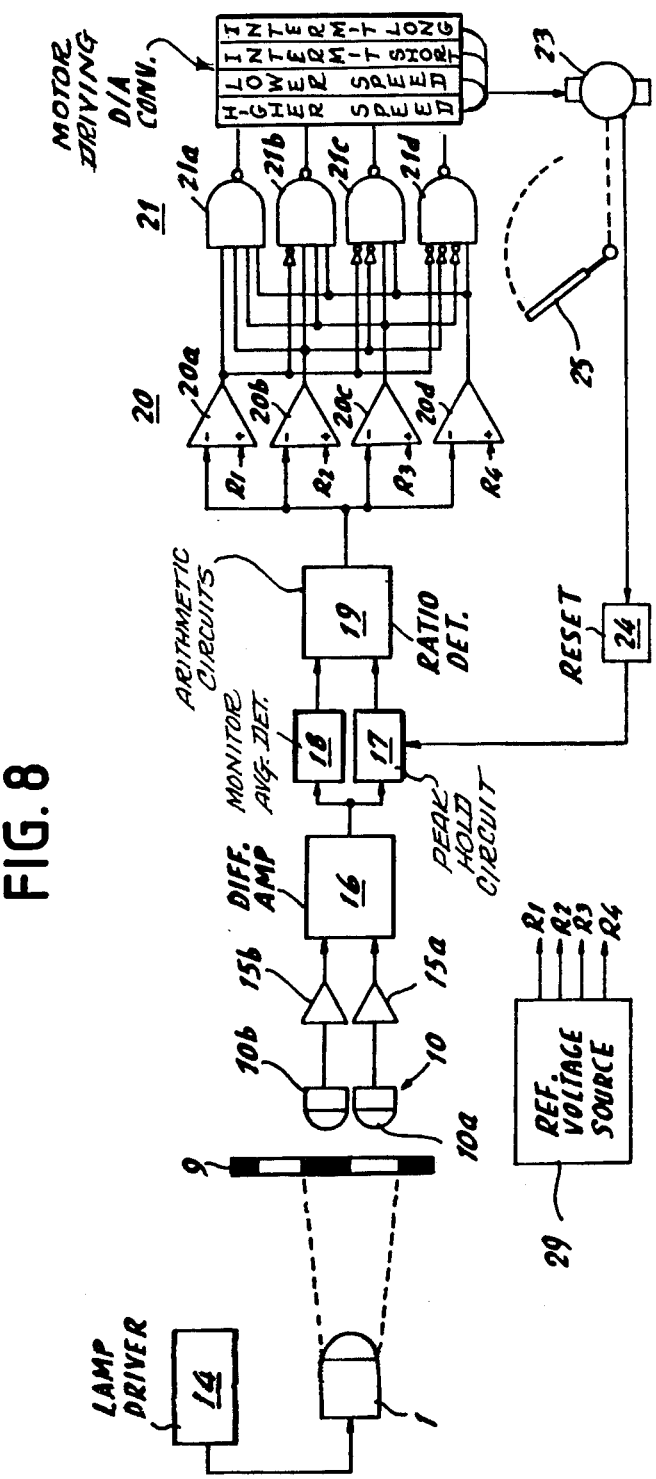
FIG. 8 is a block diagram of the windshield wiper control device.

FIG. 8 shows in block form the windshield wiper control device. The windshield wiper control device comprises a lamp driver circuit 14 for energizing the lamp 4 in the light-emitting unit 1, a pair of amplifiers 15a, 15b connected to the bright and dark photodetectors 10a, 10b for amplifying signals generated thereby, and a first arithmetic circuit 16 such as a differential amplifier for computing the difference between the amplified signals received from the amplifiers 15a, 15b to derive from the computed difference a contrast of the image of the striped pattern of the slit plate 9, which image is represented by the signals issued from the bright and dark photodetectors 10a, 10b. A peak hold circuit 17 is connected to an output terminal of the first arithmetic circuit 16 for holding a maximum value of the contrast of the striped image, and a monitor circuit 18 in the form of an average detector such as a combination of a resettable integrator and a low-pass filter is connected to another output terminal of the first arithmetic circuit 16 for monitoring the contrast as computed at all times. The windshield wiper control device also includes a second arithmetic circuit 19 in the form of a ratio detector for computing the ratio of a maximum contrast value to a normal contrast value in response to output signals from the peak hold circuit 17 and the monitor circuit 18. The second arithmetic circuit 19 thus produces data computed with the normal contrast value as a denominator and the maximum contrast value as a numerator, the data being indicative of the extent to which a wiper blade 25 (FIG. 1) has removed rain off the windshield 11 while the wiper blade 25 makes one reciprocating movement. The greater the data the smaller such an extent is and hence the more the rain remains on the windshield 11. A comparator circuit 20 includes four comparators 20a, 20b, 20c and 20d having input terminals connected to an output terminal of the second arithmetic circuit 19. The comparators 20a, 20b, 20c and 20d have as reference voltages a voltage setting $R_1$ for operating the windshield wiper 25 at a higher speed, a voltage setting $R_2$ for operating the windshield wiper 25 at a lower speed, a voltage setting $R_3$ for intermittently operating the windshield wiper 25 at shorter cyclic periods, and a voltage setting $R_4$ for intermittently operating the windshield wiper 25 at longer cyclic periods, respectively. The reference voltages $R_1, R_2, R_3, R_4$ are supplied from a reference voltage source 29. Outputs from the comparators 20a, 20b, 20c and 20d are applied to a logic circuit 21 composed of four NAND gates 21a, 21b, 21c and 21d for delivering operation command signals indicative of higher-speed operation, lower-speed operation, shorter-period intermittent operation and a longer-period intermittent operation, respectively, to a motor driver circuit 22. The motor driver circuit 22 is a decoder or digatal/analog converter responsive to a signal from the logic circuit 21 for driving a wiper motor 23 selectively at a higher speed, a lower speed, intermittently at shorter cyclic periods, or intermittently at longer cyclic periods. A reset circuit 24 is connected between the peak hold circuit 17 and the wiper motor 23 for applying a reset signal to the peak hold circuit 17 to reset the peak value held therein in response to a signal supplied from the wiper motor 23 in each cycle of wiping operation of the wiper blade 25.

Operation of the windshield wiper control device of the foregoing construction is as follows:

The lamp 4 is energized by the driver circuit 14 to emit light which is directed by the concave mirror 5 toward the photodetector unit 2. The infrared transmission filter 7 on the mirror 12 allows only a ray of infrared radiation to reach the photodetector unit 2 in the automobile compartment through the windshield 11.

Figure 6:
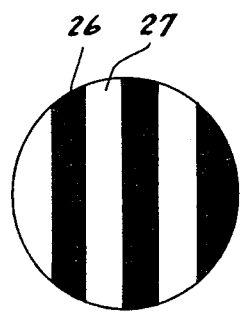
FIGS. 6 and 7 are illustrative of images of a slit plate in the photodetector of FIG. 4.
Figure 7:
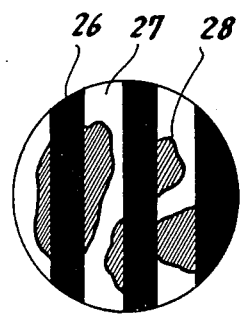

As the indicent infrared ray passes through the slit plate 9, the latter forms a striped image having alternate bright and dark areas 26, 27 which falls on the bright and dark photodetectors 10a, 10b in the sensor 10. When it is not raining and there are no raindrops on the windshield 11, the bright and dark areas 26, 27 of the striped image of the slit plate 9 appear with a clear contrast as shown in FIG. 6. When it is raining and there are raindrops on the windshield 11, on the other hand, the infrared radiation passing through the windshield 11 is obstructed by raindrops as attached to the windshield 11, and the striped image contains less bright spots 28 in the bright areas 27 as illustrated in FIG. 7, with the result that the contrast of the striped image is lowered. The difference between the signals from the bright and dark photodetectors 10a, 10b is therefore representative of the contrast of the striped image of the slit plate 9.

The signals from the bright and dark photodetectors 10a, 10b are amplified by the amplifiers 15a, 15b, respectively, and the amplified signals are applied to the first arithmetic circuit 16. The first arithmetic circuit 16 then computes the difference between the supplied signals and applies a signal indicative of the computed difference to both the peak hold circuit 17 and the monitor circuit 18. Under rainy conditions, the difference signal produced from the first arithmetic circuit 16 becomes maximum immediately after the wiper blade 25 has moved past the detection spot on the windshield 11 where the infrared radiation from the light-emitting unit 1 goes through. The difference signal is gradually lowered in magnitude as more raindrops get attached to the windshield 11 after the wiper blade 25 has moved past the detection spot. While the wiper blade 25 is in continuous operation, the difference signal is smallest immediately before the wiper blade 25 having passed the detection spot and reversed its direction of movement arrives at the detection spot again.

Consequently, the difference signal varies between its maximum and minimum values during one cycle of movement of the wiper blade 25 across the windshield 11. The difference signal is then fed to the peak hold circuit 17, which holds the maximum value of the difference signal and delivers a maximum signal to the second arithmetic circuit 19. The peak value of the difference signal which is held by the peak hold circuit 17 will be erased by a reset signal generated by the reset circuit 24 in each cycle of operation of the wiper blade 25. In a next cycle, the peak hold circuit 17 holds a new peak value of the difference signal. Therefore, the peak value is renewed each time the wiper blade 25 makes one cyclic stroke of its movement across the windshield 11.

The monitor circuit 18 monitors the difference signal from the first arithmetic circuit 16 at all times, and delivers a monitored signal to the second arithmetic circuit 19.

The second arithmetic circuit 19 computes a ratio of the output from the peak hold circuit 17 to the difference signal data from the monitor circuit 18, that is, a ratio of the peak data to the monitored difference signal data. The greater the data ratio as calculated by the second arithemtic circuit 19, the greater the quantity of raindrops remains on the windshield 11 and the worse the driver's vision therethrough. Since the peak value held in the peak hold circuit 17 is renewed by a reset signal from the reset circuit 24 in each cycle of operation of the wiper blade 25, the peak data or the reference value as the numerator of an arithmetic equation executed in the second arithmetic circuit 19 is varied in each cycle. This allows the arithmetic operation to be carried out while meeting varying conditions such as deterioration of the lamp 4 or variations in the characteristics of the sensor 10. The windshild wiper 25 can therefore be controlled accurately dependent on the quantity of raindrops remaining on the windshield 11 without being affected by the above varying factors.

The output from the second arithmetic circuit 19 is applied as a voltage signal indicative of the extent of driver's impaired vision to the comparator circuit 20. The voltage signal from the second arithemtic circuit 19 is compared by the comparators 20a, 20b, 20c and 20c with their respective reference voltage settings. Dependent on the magnitude of the signal voltage applied, the comparators 20a, 20b, 20c and 20d produce output signals selectively. For example, when the voltage signal applied to the comparator circuit 20 has a level greater than the highest voltage setting, all of the four comparators 20a, 20b, 20c and 20d issue output signals of a logic level "1". When the iuput voltage is of a second highest level, three of the four comparators issue output signals of logic "1". When the input voltage is of a third highest level, two comparators issue output signals of logic "1". When the input voltage is of a lowest level, only one comparator produces an output signal of logic "1".

The outputs from the comparators 20a, 20b, 20c and 20d in the comparator circuit 20 are applied to the logic circuit 21. The logic circuit 21 generates a signal for operating the wiper blade 25 at a higher speed when the input signals from all of the comparators 20a, 20b, 20c and 20d are of logic "1", a signal for operating the wiper blade 25 at a lower speed when the input signals from three comparators are of logic "1", a signal for operating the wiper blade 25 intermittently at shorter cyclic periods when the input signals from two comparators are of logic "1", and a signal for operating the wiper blade 25 intermittently at longer cyclic periods when the input signal from only one comparator is of logic "1".

The signal from the comparator circuit 20 is then applied to the motor driver circuit 22. In response to the applied signal, the motor driver circuit 22 decodes the applied signal by converting it from a digital signal to a unique voltage which operates the wiper motor 23 selectively at a higher speed, a lower speed, intermittently at shorter cyclic periods, or intermittently at longer cyclic periods, to enable the wiper blade 25 to wipe raindrops off the windshield 11.

The windshield wiper control device of the above construction is therefore capable of automatically controlling the wiper blade 25 to select the speed or period of its operation dependent on the quantity of raindrops on the windshield 11. Under rainy conditions, a clear vision can be attained through the windshield 11 without obstructing the driver's driving operation.

Figure 9:
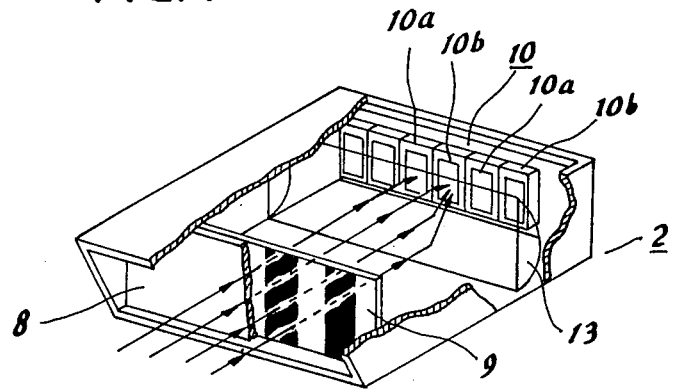
FIG. 9 is a perspective view, with parts cut away, of a photodetector according to another embodiment of the present invention.

FIG. 9 shows another embodiment in which a cylindrical lens 13 is placed in front of the phototectors 10a, 10b in the photodetector unit 2 for focusing the incident ray having passed through the slit plate 9 on the photodetectors 10a, 10b along a horizontal central line thereon. This arrangement enables the sensor 10 to have an increased light sensitivity.

Figure 10:
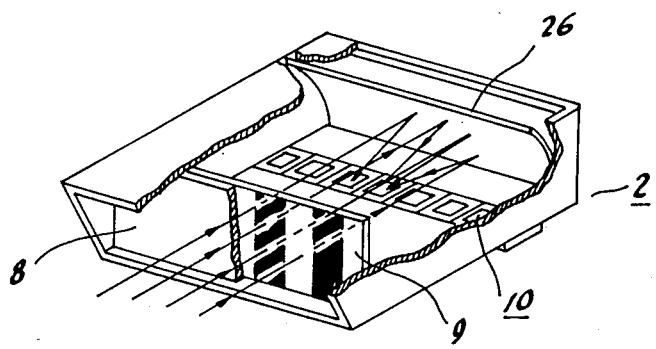
FIG. 10 is a perspective view, with parts cut away, of a photodetector according to still another embodiment of the present invention.

According to still another embodiment illustrated in FIG. 10, a concave mirror 26 is positioned back in the photodetector unit 2 in spaced relation to the slit plate 9 and the sensor 10 is placed horizontally on the bottom of the unit 2 with the photodetectors 10a, 10b facing upwardly. The ray of infrarad radition through the slit plate 9 is focused by the concave mirror 26 on the photodetectors 10a, 10b along a straight line thereon. This construction also enables the sensor 10 to have an increased light sensitivity.

By focusing the infrared radiation through the slit plate 9 along a line on the photodetectors 10a, 10b with the use of a lens or a concave mirror, the optical information vertically across the slit plate 9 can be intensified and therefore the amount of light emitted from the lamp 4 in the light-emitting unit 1 may be reduced.

Figure 11:
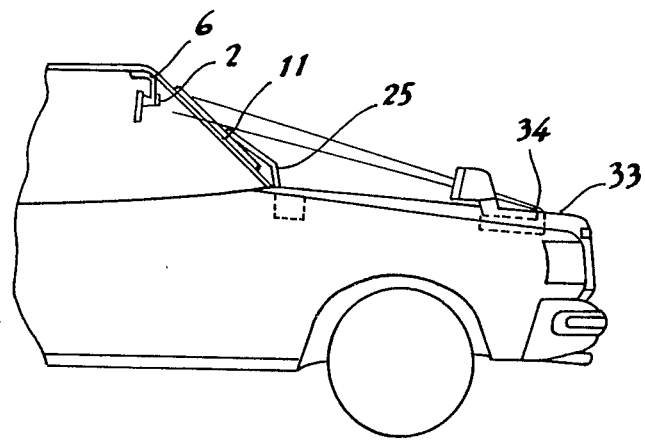
FIG. 11 is a side elevational view showing a light-emitting unit according to another embodiment as attached to an automobile.
Figure 12:
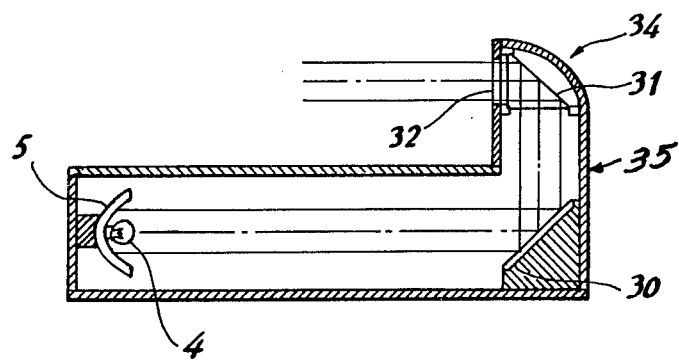
FIG. 12 is an enlarged cross-sectional view of the light-emitting unit shown in FIG. 11.

FIGS. 11 and 12 illustrate a light-emitting unit 34 constructed according to another embodiment. The light-emitting unit 34 is mounted on a front portion of an engine hood 33. As shown in FIG. 12, the light-emitting unit 34 includes a casing or housing 35, an electric lamp 4 mounted in the casing 35, a concave mirrors 5 positioned in the casing 35 behind the lamp 4 for collecting rays of light emitted therefrom, a reflecting mirror 30 mounted in the casing 35 for directing the light rays upwardly, and a prism 31 mounted in the casing 35 for directing the light rays to the left through an infrared transmission filter 32 mounted in an opening defined in the casing 35.

Although certain preferred embodiments of the present invention have been shown and described in detail, it should be understood that various changes and modifications may be made therein without departing from the scope of the appended claims. For exmple, the lamp 4 and the filter 7 or 32 may be replaced with an infrared light-emitting diode.

What is claimed is:

1. A windshield wiper control device for use on a vehicle having a compartment with a windshield and a windshield wiper movable across the windshield, comprising:
    (a) a light-emitting unit adapted to be mounted on the vehicle outside of the compartment for emitting a ray of electromagnetic radiation;
    (b) a photodetector unit adapted to be mounted on the vehicle within the compartment and having a slit plate for producing an image of a predetermined pattern with bright and dark areas in response to exposure to said ray of electromagnetic radiation through the windshield and an array of photodetectors for sensing said bright and dark areas of said image and generating signals indicative of said bright and dark areas; and
    (c) an arithmetic circuit arrangement for computing a contrast of the bright and dark areas based on said signals from said photodetectors and controlling the speed and/or period of operation of the windshield wiper based on said contrast.

2. A windshield wiper control device according to claim 1, including a rearview mirror adapted to be mounted on the vehicle outside of the compartment, said light-emitting unit comprising an electric lamp mounted in said rearview mirror, a concave mirror for directing a ray of electromagnetic radiation from said electric lamp, and an infrared transmission filter for allowing an infrared ray to pass therethrough toward said photodetector unit.

3. A windshield wiper control device according to claim 1, wherein said light-emitting unit comprises a casing, an electric lamp mounted in said casing, a concave mirror positioned in said casing behind said lamp for collecting a ray of electromagnetic radiation emitted therefrom, a reflecting mirror mounted in said casing for directing said ray in one direction, and a prism mounted in said casing for directing said ray in another direction, and an infrared transmission filter mounted in said casing for allowing an infrared ray to pass therethrough toward said photodetector unit.

4. A windshield wiper control device according to claim 1, wherein said photodetector unit further includes a cylindrical lens for focusing said ray of electromagnetic radiation on said array of photodetectors substantially along a straight line thereon.

5. A windshield wiper control device according to claim 1, wherein said photodetector unit further includes a concave mirror for focusing said ray of electromagnetic radiation on said array of photodetectors substantially along a straight line thereon.

6. A windshield wiper control device according to claim 1, wherein said arithmetic circuit arrangement comprises a first arithmetic circuit for computing a difference between said signals from said photodetectors, a peak hold circuit for holding a peak value of said difference, a monitor circuit for monitoring said difference at all times, a second arithmetic circuit for computing a ratio of said peak value from said peak hold circuit to said difference from said monitor circuit, a comparator circuit for comparing said ratio with a plurality of reference voltages, a logic circuit for selectively producing output signals in response to an output signal from said comparator circuit, a motor for operating the windshield wiper, and a driver circuit for enerigizing said motor to operate the windshield wiper at a speed and/or period of operation dependent on the selected output signal from said logic circuit.

7. A windshield wiper control device according to claim 6, wherein said arithmetic circuit arrangement further includes a reset circuit responsive to a signal from said motor for producing a reset signal to renew said peak value in said peak hold circuit in each cycle of operation of the windshield wiper.

8. A windshield wiper control device according to claim 6, wherein said reference voltages include a voltage setting for operating the windshield wiper at a higher speed, a voltage setting for operating the windshield wiper at a lower speed, a voltage setting for operating the windshield wiper intermittently at shorter periods, and a voltage setting for operating the windshield wiper intermittently at longer periods.

* * * * *